United States Patent
Kukade et al.

(10) Patent No.: US 10,402,836 B2
(45) Date of Patent: Sep. 3, 2019

(54) SYSTEM AND METHOD FOR SELECTING GEOGRAPHIC REGIONS FOR PRESENTATION OF CONTENT BASED ON CHARACTERISTICS OF ONLINE SYSTEM USERS IN DIFFERENT GEOGRAPHIC REGIONS

(71) Applicant: Facebook, Inc., Menlo Park, CA (US)

(72) Inventors: Anusaya Kukade, Singapore (SG); Patrick James Kemp, Menlo Park, CA (US); Nikhil Tarun Shah, Northwood (GB)

(73) Assignee: Facebook, Inc., Menlo Park, CA (US)

( * ) Notice: Subject to any disclaimer, the term of this patent is extended or adjusted under 35 U.S.C. 154(b) by 168 days.

(21) Appl. No.: 15/421,391

(22) Filed: Jan. 31, 2017

(65) Prior Publication Data

US 2018/0218378 A1     Aug. 2, 2018

(51) Int. Cl.

| | |
|---|---|
| *G06Q 30/02* | (2012.01) |
| *H04L 29/06* | (2006.01) |
| *H04W 4/021* | (2018.01) |
| *H04W 4/02* | (2018.01) |
| *H04W 12/00* | (2009.01) |
| *H04L 29/08* | (2006.01) |

(52) U.S. Cl.
CPC ....... *G06Q 30/0201* (2013.01); *H04L 63/107* (2013.01); *H04L 67/18* (2013.01); *H04W 4/021* (2013.01); *H04W 4/023* (2013.01); *H04W 12/00503* (2019.01); *H04L 67/22* (2013.01)

(58) Field of Classification Search
CPC ........... G06Q 30/0261; G06Q 30/0205; G06Q 30/0259

IPC ...................... G06Q 30/0261,30/0259, 30/0205
See application file for complete search history.

(56) References Cited

U.S. PATENT DOCUMENTS

| | | | | |
|---|---|---|---|---|
| 6,100,901 A | * | 8/2000 | Mohda | G06K 9/6218 345/440 |
| 6,430,539 B1 | * | 8/2002 | Lazarus | G06Q 30/02 705/14.1 |

(Continued)

OTHER PUBLICATIONS

Chen, Jenny, Retail Customer Segmentation using SAS Calgary SAS Users Group meeting, Apr. 2014 (Year: 2014).*

(Continued)

*Primary Examiner* — Scott L Jarrett
(74) *Attorney, Agent, or Firm* — Fenwick & West LLP

(57) ABSTRACT

An online system selects different geographic regions to evaluate content presented by the online system. The online system pairs a geographic region with another geographic region based on similarity of the geographic regions. To assist this pairing, the online system identifies users associated with locations within a threshold distance of different geographic regions and retrieves demographic and other characteristics of users associated with locations within the threshold distance of one or more geographic regions. Based on the retrieved characteristics and characteristics of the geographic regions, the online system generates vectors for different geographic regions. For each possible pairing of geographic regions, the online system computes a distance value and selects a pairing of geographic regions based on the distance values. For example, the online system selects a pair of geographic regions associated with a minimum distance value.

20 Claims, 3 Drawing Sheets

(56) References Cited

U.S. PATENT DOCUMENTS

| | | | | |
|---|---|---|---|---|
| 6,795,710 | B1* | 9/2004 | Creemer | H04W 4/029 455/456.3 |
| 7,822,629 | B2* | 10/2010 | Chen | G06Q 30/0201 705/7.29 |
| 7,908,159 | B1* | 3/2011 | Ordonez | G06Q 30/02 705/7.33 |
| 8,799,061 | B1* | 8/2014 | Chatterjee | G06Q 30/0261 705/14.1 |
| 9,032,282 | B2* | 5/2015 | Kummer | G06F 11/3672 715/205 |
| 9,053,185 | B1* | 6/2015 | Liu | G06F 17/30864 |
| 9,251,536 | B2* | 2/2016 | Caralis | G06Q 30/0631 |
| 9,317,869 | B2* | 4/2016 | Garcia-Martinez | G06Q 30/0251 |
| 9,898,756 | B2* | 2/2018 | Allan | G06Q 30/0255 |
| 2002/0169655 | A1* | 11/2002 | Beyer | G06Q 30/02 705/7.33 |
| 2003/0105658 | A1* | 6/2003 | Chen | G06Q 30/02 705/7.29 |
| 2005/0187823 | A1* | 8/2005 | Howes | G06Q 30/02 705/14.58 |
| 2007/0264968 | A1* | 11/2007 | Frank | G06Q 30/02 455/404.2 |
| 2008/0133336 | A1* | 6/2008 | Altman | G06Q 30/0207 455/456.1 |
| 2008/0147485 | A1* | 6/2008 | Osagami | G06Q 30/02 705/7.31 |
| 2008/0270363 | A1* | 10/2008 | Hunt | G06F 16/2462 |
| 2009/0006211 | A1* | 1/2009 | Perry | G06Q 30/02 705/14.66 |
| 2009/0024476 | A1* | 1/2009 | Baar | G06Q 30/02 705/14.53 |
| 2009/0125396 | A1* | 5/2009 | Otto | G06Q 10/087 705/14.26 |
| 2011/0035458 | A1* | 2/2011 | Burnim | G06Q 30/02 709/206 |
| 2011/0040601 | A1* | 2/2011 | Bai | G06Q 30/02 705/7.29 |
| 2011/0097001 | A1* | 4/2011 | Labbi | G06K 9/6219 382/225 |
| 2011/0276392 | A1* | 11/2011 | Vaver | G06Q 30/02 705/14.43 |
| 2011/0320259 | A1* | 12/2011 | Roumeliotis | G06Q 30/02 705/14.41 |
| 2012/0005016 | A1* | 1/2012 | Graff | G06Q 30/0242 705/14.49 |
| 2012/0016733 | A1* | 1/2012 | Belvin | G06Q 30/02 705/14.41 |
| 2012/0036015 | A1* | 2/2012 | Sheikh | G06Q 30/02 705/14.54 |
| 2012/0042262 | A1* | 2/2012 | Priyadarshan | G06Q 30/0269 715/745 |
| 2012/0226559 | A1* | 9/2012 | Baum | G06Q 30/02 705/14.66 |
| 2012/0245995 | A1* | 9/2012 | Chawla | G06Q 30/02 705/14.45 |
| 2012/0303446 | A1* | 11/2012 | Busch | H04W 4/029 705/14.45 |
| 2013/0054698 | A1* | 2/2013 | Lee | G06Q 30/0259 709/204 |
| 2014/0172573 | A1* | 6/2014 | Saurabh | G06Q 30/0261 705/14.58 |
| 2014/0172855 | A1* | 6/2014 | Arnoux | G06F 17/30598 707/737 |
| 2014/0278990 | A1* | 9/2014 | Swanson | G06Q 30/0257 705/14.55 |
| 2015/0026522 | A1* | 1/2015 | Young | G06Q 30/0243 714/38.1 |
| 2016/0117717 | A1* | 4/2016 | Moreau | G06Q 30/0243 705/14.42 |
| 2016/0239857 | A1* | 8/2016 | Milton | H04W 4/029 |
| 2016/0321702 | A1* | 11/2016 | Lerman | G06Q 30/0267 |
| 2016/0358190 | A1* | 12/2016 | Terrazas | G06Q 30/0201 |

OTHER PUBLICATIONS

M. Sarstedt and E. Mooi, A Concise Guide to Market Research, Chapter 9—Cluster Analysis Springer Texts in Business and Economics, Springer-Verlag Berlin Heidelberg 2014 (Year: 2014).*

Latta, Michael, An Experiment in Testing Advertising Levels by Measuring Natural Test Market Variation Atlantic Marketing Journal, vol. 2, No. 2, Dec. 7, 2013 (Year: 2013).*

Sign, Avatar Ram, How to Use Facebook Advanced Location Targeting for More Engagement Social Media Marketing Word, May 12, 2015 (Year: 2015).*

Huang, Jih-Jeng et al., Marketing segmentation using support vector clustering Expert Systems with Applications, vol. 32, 2007 (Year: 2007).*

Puckett, Jason, What is Multivariate Ad Testing AdBasis, Jul. 1, 2014 (Year: 2014).*

Young, Wesley, 10 Practical Tips for Using Geo-Location To Reach Your Target Audience SearchEngineLand.com, Mar. 30, 2015 (Year: 2015).*

* cited by examiner

SYSTEM AND METHOD FOR SELECTING GEOGRAPHIC REGIONS FOR PRESENTATION OF CONTENT BASED ON CHARACTERISTICS OF ONLINE SYSTEM USERS IN DIFFERENT GEOGRAPHIC REGIONS

BACKGROUND

This disclosure relates generally to presenting content to users of an online system, and more specifically to selecting different geographic regions for presenting content via the online system to evaluate the presented content.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users. Content provided to an online system by a user may be declarative information provided by a user, status updates, check-ins to locations, images, photographs, videos, text data, or any other information a user wishes to share with additional users of the online system. An online system may also generate content for presentation to a user, such as content describing actions taken by other users on the online system.

Additionally, many online systems commonly allow publishing users (e.g., businesses) to sponsor presentation of content on an online system to gain public attention for a user's products or services or to persuade other users to take an action regarding the publishing user's products or services. Content for which the online system receives compensation in exchange for presenting to users is referred to as "sponsored content." Many online systems receive compensation from a publishing user for presenting online system users with certain types of sponsored content provided by the publishing user. Frequently, online systems charge a publishing user for each presentation of sponsored content to an online system user or for each interaction with sponsored content by an online system user. For example, an online system receives compensation from a publishing user each time a content item provided by the publishing user is displayed to another user on the online system or each time another user is presented with a content item on the online system and interacts with the content item (e.g., selects a link included in the content item), or each time another user performs another action after being presented with the content item.

A publishing user providing content to an online system for presentation to other online system users often seeks to evaluate effectiveness of the content in causing other online system users to take action. For example, the publishing user seeks to determine whether users to whom a content item was presented via the online system more frequently visited a physical location than other users to whom the content item was not presented. Presenting content to users and withholding content to other users who have matching or similar characteristics of users to whom the content was presented allows the online system to more accurately evaluate effectiveness of the content in causing user action. However, if effectiveness of a content item is based on causing users to visit a physical location, the online system may have a limited number of users within a threshold distance of the physical location, impairing the online system's ability to identify similar users to whom the content item is presented and to whom the content item is withheld. As users in different geographic regions may have different characteristics, the purchasing user may be unable to readily identify users to whom a content item is presented in a different geographic location that has a corresponding physical location who have characteristics matching or similar to users in another geographic region to whom the content item was withheld from presentation. This may impair a publishing user's ability to accurately assess effectiveness of a content item in causing online system users to visit a physical location.

SUMMARY

An online system maintains information describing characteristics of various online system users. For example, the online system maintains a user profile associated with each user of the online system. In various embodiments, a user profile maintained by the online system for a user includes demographic information of the user (e.g., age, gender) as well as other characteristics of the user. Example characteristics of the user include one or more interests of the user, one or more locations associated with the user, an educational history of the user, an employment history of the user, or any other suitable characteristics of the user. Additionally, the user profile of the user identifies actions performed by the user and identified to the online system and connections between the user and additional users of the online system.

Additionally, the online system determines locations associated with various users based on location information received from client devices associated with users. A client device associated with a user provides the online system with a location of the client device, and the online system determines the location of the user associated with the client device as the location of the client device. For example, the client device executes an application associated with the online system that transmits location information to the online system at periodic intervals while the application is executing. In various embodiments, the user associated with the online system specifies one or more privacy settings regulating communication of location information from the client device to the online system.

The online system also identifies a plurality of geographic regions based on information from a user or from a third party system. For example, a user or a third party system provides the online system with coordinates (e.g., latitude and longitude) of multiple geographic regions. Each geographic region may correspond to a physical location associated with the user or associated with the third party system. For example, the user is a business, and each geographic region identifies a physical location of a retail location operated by or associated with the business. The user or the third party system may transmit a request to the online system that identifies the geographic regions in some embodiments. Alternatively, information identifying different geographic regions associated with the user or with the third party system is included in a user profile of the user or of the third party system maintained by the online system (or in other information associated with the user or with the third party system maintained by the online system).

For each of the geographic regions, the online system determines sets of users associated with locations within a threshold distance of a geographic region. The online system stores information associating each set of users with a geographic region, so the set of users associated with a geographic region identifies users associated with locations within the threshold distance of the geographic region. In various embodiments, the user or the third party system associated with the geographic region specifies the threshold distance. For example, the user or the third party system specifies the threshold distance when providing the online system with information identifying the geographic regions. Alternatively, the online system determines the threshold distance based on any suitable criteria. For example, the online system determines the threshold distance based on prior interactions by users that identified additional geographic locations having at least a threshold amount of characteristics matching characteristics of the identified geographic regions. For example, if the geographic regions correspond to retail locations, the online system determines the threshold distance based on prior interactions by users that identified other retail locations having at least a threshold amount of characteristics matching or similar to characteristics of the retail locations; as an example, the online system determines the threshold distance as an average distance between interactions by users identifying another retail location and locations of client device from which the online system receive information describing the interactions. The online system stores information identifying users determined to be associated with locations within the threshold distance of a geographic region in association with information identifying the geographic region. This allows the online system to subsequently identify users who were within the threshold distance of a particular geographic location.

In various embodiments, the online system determines sets of users for each geographic region that include users who were associated with locations within the threshold distance of a geographic region within a specific time interval. For example, if the geographic region corresponds to a retail location, a set of users determine for a particular retail location includes users who were associated with locations within the threshold distance of the retail location within one month of a current time. The user or third party system associated with the geographic regions may specify the specific time interval in some embodiments. Alternatively, the online system determines the specific time interval; for example, the online system retrieves time intervals previously specified by the user or by the third party system associated with the geographic regions or retrieves time intervals previously specified for other geographic regions having at least a threshold number of characteristics matching characteristics of the geographic region (e.g., for other retail locations selling at least a threshold number of products matching products sold by retail locations corresponding to the geographic locations).

From the information maintained for various users, the online system retrieves characteristics of users in each set of users. The online system may retrieve a subset of characteristics of each user in a set in various embodiments. In various embodiments, the user or the third party system associated with the geographic regions specifies the subset of characteristics of users in a set retrieved by the online system. Example characteristics of a user in a set retrieved by the online system include: demographic information about the user (e.g., an age of the user, a gender of the user), interests of the user, locations associated with the user (e.g., a hometown, a residence), actions performed by the user and maintained by the online system, one or more objects connected to the user via the online system, content provided to the online system by the user, or any other suitable information.

The online system may also obtain characteristics of each of the geographic regions. In various embodiments, the online system requests characteristics of various geographic regions from the user or from the third party system associated with the geographic regions. Alternatively, the online system retrieves stored characteristics of different geographic regions previously received from the user or the third party system associated with the geographic regions and stored by the online system. Example characteristics associated with a geographic region include: products associated with the geographic region (e.g., products offered for sale at a geographic region), a number of one or more products sold from a geographic region, an amount of revenue obtained by a geographic region, an amount of revenue from selling one or more products, an amount of revenue obtained by the geographic region within a specified time interval, or any other suitable information.

Based on the characteristics of the sets of users and the characteristics of the geographic regions, the online system generates representations of each geographic region. A representation of a geographic region is generated from characteristics of a set of users associated with the geographic region and obtained characteristics of the geographic region. For example, the online system generates a vector for each of the geographic regions, with the vector for a geographic region based on characteristics of users of the set associated with the geographic region and characteristics of the geographic region. In one embodiment, the dimensions of the vector for a geographic region equal the number of characteristics of users of the set associated with the geographic region and characteristics of the geographic region.

Based on the representations, the online system determines similarities between various pairs of geographic regions based on vectors generated for the geographic regions. In various embodiments, the online system determines similarities between vectors generated for each pair of geographic region. For example, the online system determines distance values between each pair of vectors generated for geographic regions. The distance value between a pair of vectors is a Euclidean distance in various embodiments. Alternatively, the online system determines cosine similarities between each pair of vectors. In other embodiments, the online system determines any suitable measure of similarity between various pairs of vectors generated for different geographic regions.

Using the similarities between different pairs of vectors generated for geographic regions, the online system selects a pairing of a geographic region and an additional geographic region. In various embodiments, the online system selects a geographic region and an additional geographic region associated with vectors having a maximum similarity. If the online system determines cosine similarities between pairs of vectors, the online system identifies a pair of vectors having a maximum cosine similarity and selects a geographic region and an additional geographic region corresponding to the identified pair of vectors. If the online system determines distances between pairs of vectors, the online system identifies a pair of vectors having a minimum distance and selects a geographic region and an additional geographic region corresponding to the identified pair of vectors. However, in various embodiments, the online system selects a pairing including a geographic region and an additional geographic region corresponding to vectors having a maximum similarity. The online system may select the pairing of the geographic region and the additional geographic region in response to receiving a request from a user or a third party system associated with the geographic regions.

Subsequently, the online system presents certain content to users associated with locations within the threshold distance of to one of the geographic regions included in the selected pairing while withholding the certain content from users within the threshold distance of the other geographic region included in the selected pairing. For example, the online system presents a content item to an additional user associated with a location within the threshold distance of the geographic region included in the selected pairing and withholds presentation of the content item to another user associated with a location within the threshold distance of the additional geographic region included in the selected pairing. Because the online system selects the pairing so the geographic region and the additional geographic region included in the selected pairing have a maximum similarity, presenting content to users with locations within a threshold distance of a geographic region included in the selected pairing and withholding content to users with locations within the threshold distance of the other geographic region included in the selected pairing allows the online system to more accurately evaluates how presentation of the content influences user behavior.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
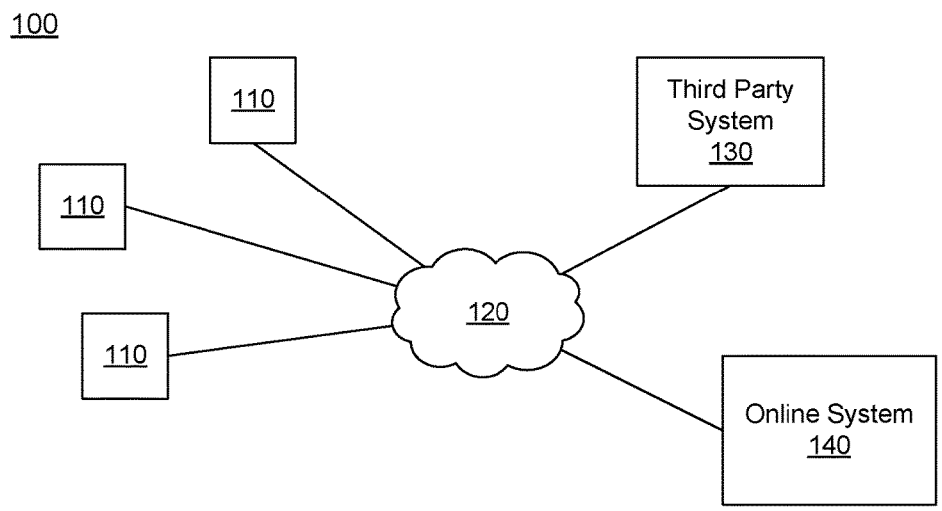
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Various third party systems 130 provide content to users of the online system 140. For example, a third party system 130 maintains pages of content that users of the online system 140 may access through one or more applications executing on a client device 110. The third party system 130 may provide content items to the online system 140 identifying content provided by the online system 130 to notify users of the online system 140 of the content provided by the third party system 130. For example, a content item provided by the third party system 130 to the online system 140 identifies a page of content provided by the online system 140 that specifies a network address for obtaining the page of content. If the online system 140 presents the content item to a user who subsequently accesses the content item via a client device 110, the client device 110 obtains the page of content from the network address specified in the content item. This allows the user to more easily access the page of content.

Figure 2:
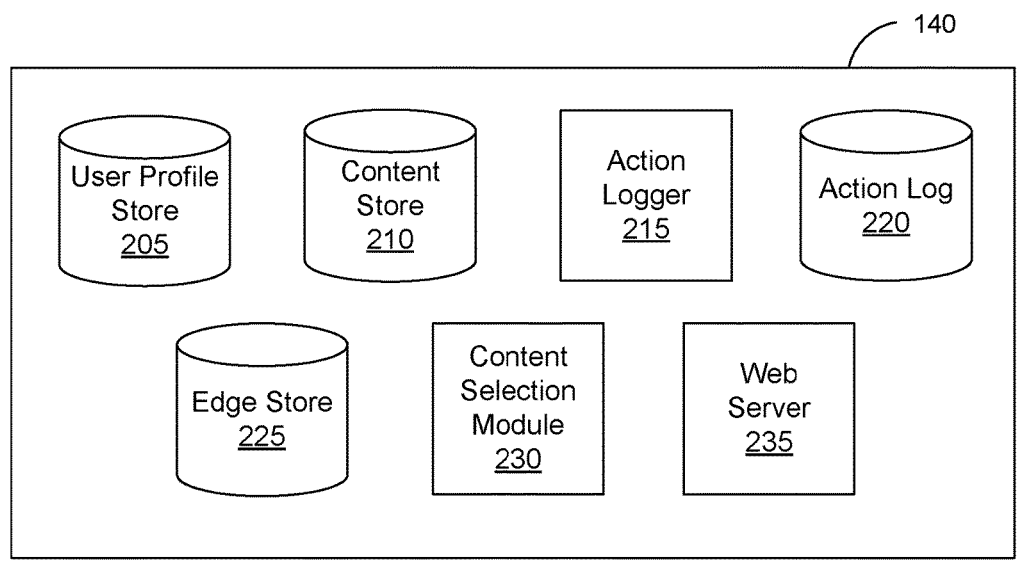
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content selection module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image, with information identifying the images in which a user is tagged stored in the user profile of the user. A user profile in the user profile store 205 may also maintain references to actions by the corresponding user performed on content items in the content store 210 and stored in the action log 220.

Each user profile includes user identifying information allowing the online system 140 to uniquely identify users corresponding to different user profiles. For example, each user profile includes an electronic mail ("email") address, allowing the online system 140 to identify different users based on their email addresses. However, a user profile may include any suitable user identifying information associated with users by the online system 140 that allows the online system 140 to identify different users.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other social networking system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third party applications or third party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include a creative, which is content for presentation to a user, and a bid amount. The creative is text, image, audio, video, or any other suitable data presented to a user. In various embodiments, the creative also specifies a page of content. For example, a content item includes a landing page specifying a network address of a page of content to which a user is directed when the content item is accessed. The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, advertisements or other content with which the user engaged, purchases made, and other patterns from shopping and buying. Hence, the action log 220 may include information identifying content provided by one or more third party systems 130 that a user of the online system 140 has accessed or content provided by one or more third party systems 130 with which the user of the online system 140 otherwise interacted. Various third party systems 130 may include tracking mechanisms in content comprising instructions that, when executed by a client device 110, provide information identifying the content and identifying a user of the online system 140 associated with the client device 110 to the online system 140. In various embodiments, the information provided by the tracking mechanism identifies one or more products associated with a third party system 130 and include in, or otherwise associated with, the identified content. The information identifying the content is stored in the action log 220 in association with information identifying the user to the online system 140. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on characteristics associated with the user by the online system 140 and based on the user's affinity for different content items. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user.

Content items eligible for presentation to the user may include content items associated with bid amounts. The content selection module 230 uses the bid amounts associated with ad requests when selecting content for presentation to the user. In various embodiments, the content selection module 230 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the ad request's bid amount and a likelihood of the user interacting with the content item. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 230 receives a request to present a feed of content to a user of the online system 140. The feed may include one or more content items associated with bid amounts and other content items that are not associated with bid amounts, such as stories describing actions associated with other online system users connected to the user. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 230 presents content to a user through a newsfeed including a plurality of content items selected for presentation to the user. One or more content items may also be included in the feed. The content selection module 230 may also determine the order in which selected content items are presented via the feed. For example, the content selection module 230 orders content items in the feed based on likelihoods of the user interacting with various content items.

In various embodiments, the content selection module 230 maintains geographic regions specified by a user or by a third party system 130. For example, the geographic regions correspond to retail locations associated with the user or with the third party system 130. To allow the user or the third party system 130 to evaluate effectiveness of one or more content items in causing users presented with the one or more content items to perform various actions, the content selection module 230 selects a pairing of a geographic region and an additional geographic region based on characteristics of users who were associated with locations within a threshold distance of one or more of the geographic regions. As further described below in conjunction with FIG. 3, to select the pairing, the content selection module determines representations of different geographic regions, with a representation of a geographic region based on characteristics of users associated with a location within the threshold distance of the geographic region. The representation of the geographic region may also be based on characteristics of the geographic region itself (e.g., revenue received by the geographic region, a number of one or more actions associated with the geographic region, etc.).

Based on the representations of various geographic regions, the content selection module 230 determines similarities between various pairings of geographic regions. For example, a similarity between a geographic region and an additional geographic region is a distance value between a representation of the geographic region and a representation of the additional geographic region. Determination of similarity between a pairing of geographic regions is further described below in conjunction with FIG. 3. The content selection module 230 subsequently presents the one or more content items to users associated with locations within the threshold distance (or within an additional threshold distance) of a geographic region of the selected pairing, while withholding the one or more content items from presentation to users within the threshold distance (or within the additional threshold distance) of the other geographic region of the selected pairing. As the content selection module 230 selects the pairing of geographic region and additional geographic region based on similarities between different geographic regions, the one or more content items in the preceding example are presented from and withheld from users most likely to be similar to each other, allowing more accurate evaluation of effectiveness of one or more content items in inducing users to perform one or more actions.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, or BlackberryOS.

Figure 3:
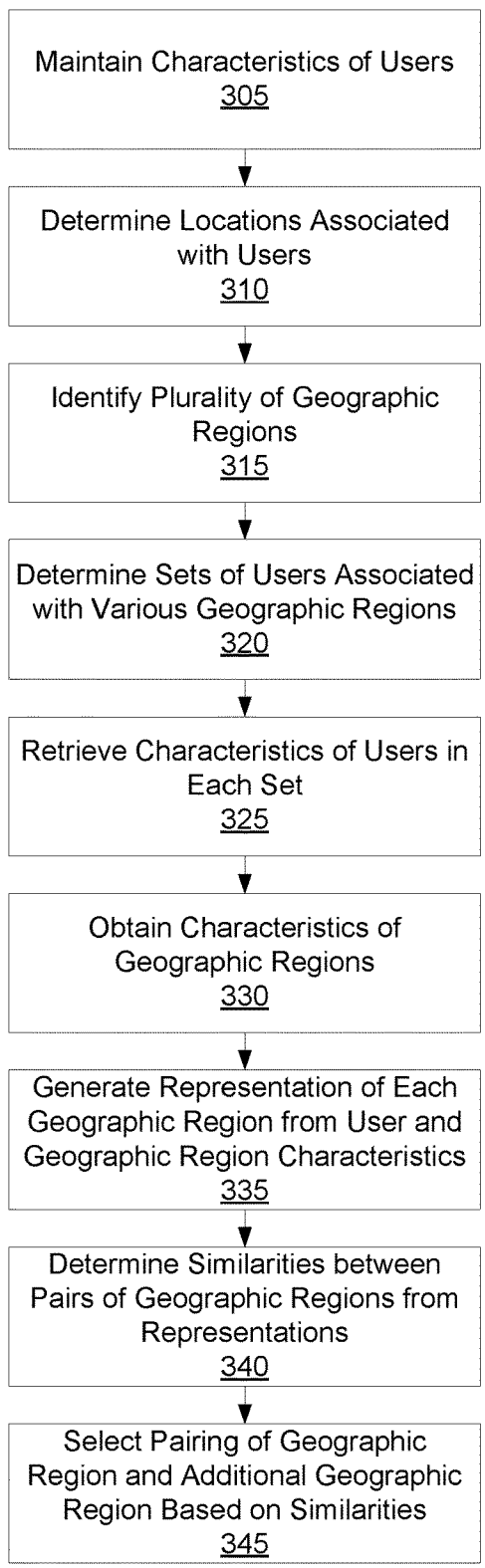
FIG. 3 flowchart of a method selecting geographic regions for presenting content to online system users based on characteristics of users maintained by the online system, in accordance with an embodiment.

Selecting Geographic Regions for Evaluating Presentation of Content to Online System Users FIG. 3 is a flowchart of one embodiment of a method for selecting geographic regions for presenting content to online system users based on characteristics of users maintained by the online system 140. In other embodiments, the method may include different and/or additional steps than those shown in FIG. 3. Additionally, steps of the method may be performed in different orders than the order described in conjunction with FIG. 3 in various embodiments.

As further described above in conjunction with FIG. 2, the online system 140 maintains 305 information describing characteristics of various online system users. For example, the online system 140 maintains 305 a user profile associated with each user of the online system 140. In various embodiments, a user profile maintained 305 by the online system 140 for a user includes demographic information of the user (e.g., age, gender) as well as other characteristics of the user. Example characteristics of the user include one or more interests of the user, one or more locations associated with the user, an educational history of the user, an employment history of the user, or any other suitable characteristics of the user. Additionally, the user profile of the user identifies actions performed by the user and identified to the online system 140 and connections between the user and additional users of the online system 140, as further described above in conjunction with FIG. 2.

Additionally, the online system 140 determines 310 locations associated with various users based on location information received from client devices 110 associated with various users. A client device 110 associated with a user provides the online system 140 with a location of the client device 110, and the online system 140 determines 310 the location of the user associated with the client device 110 as the location of the client device 110. In various embodiments, a client device 110 provides location information to the online system 140 at periodic intervals, allowing the online system 140 to periodically determine 310 a location of the user associated with the client device 110 based on the received location information. For example, the client device 110 executes an application associated with the online system 140 that transmits location information to the online system 140 at periodic intervals while the application is executing. In various embodiments, the user associated with the online system 140 specifies one or more privacy settings regulating communication of location information from the client device 110 to the online system 140; hence, a user may prevent the client device 110 from providing location information to the online system 140 or may limit an amount of location information provided to the online system 140 by the client device 110. Alternatively, a client device 110 provides location information to the online system 140 in response to a request from the user associated with the client device 110. In other embodiments, the client device 110 provides location information to the online system 140 when a location of the client device 110 is greater than a threshold distance from a prior location of the client device 110 provided to the online system 140.

Additionally, a user associated with the client device 110 may include a location associated with the user in content provided to the online system 140 via a client device 110. For example, a user checks-in to a location via a client device 110, and the check-in is communicated to the online system 140. The online system 140 determines 310 the location to which the user checked-in is associated with the user. Similarly, the user may identify a location in content posted to the online system 140 by a client device 110, and the client device 110 determines 310 the location identified in the content is associated with the user. The online system 140 stores information specifying a location determined 310 to be associated with the user in a user profile of the user or in association with a user profile of the user.

The online system 140 identifies 315 a plurality of geographic regions based on information from a user or from a third party system 130. For example, a user or a third party system 130 provides the online system with coordinates (e.g., latitude and longitude) of multiple geographic regions. Each geographic region may correspond to a physical location associated with the user or associated with the third party system 130. For example, the user is a business, and each geographic region identifies a physical location of a retail location operated by or associated with the business. The user or the third party system 130 may transmit a request to the online system 140 that identifies the geographic regions in some embodiments. Alternatively, information identifying 315 different geographic regions associated with the user or with the third party system 130 is included in a user profile of the user or of the third party system 130 maintained by the online system 140 (or in other information associated with the user or with the third party system 130 maintained by the online system 140).

For each of the geographic regions, the online system 140 determines 320 sets of users associated with locations within a threshold distance of a geographic region. The online system 140 stores information associating each set of users with a geographic region, so the set of users associated with a geographic region identifies users associated with locations within the threshold distance of the geographic region. In various embodiments, the user or the third party system 130 associated with the geographic region specifies the threshold distance. For example, the user or the third party system 130 specifies the threshold distance when providing the online system 140 with information identifying the geographic regions. Alternatively, the online system 140 determines the threshold distance based on any suitable criteria. For example, the online system 140 determines the threshold distance based on prior interactions by users that identified additional geographic locations having at least a threshold amount of characteristics matching characteristics of the identified geographic regions. For example, if the geographic regions correspond to retail locations, the online system 140 determines the threshold distance based on prior interactions by users that identified other retail locations having at least a threshold amount of characteristics matching or similar to characteristics of the retail locations; as an example, the online system 140 determines the threshold distance as an average distance between interactions by users identifying another retail location and locations of client device 110 from which the online system 140 receive information describing the interactions. The online system 140 stores information identifying users determined 320 to be associated with locations within the threshold distance of a geographic region in association with information identifying the geographic region. This allows the online system 140 to subsequently identify users who were within the threshold distance of a particular geographic location.

In various embodiments, the online system 140 determines 320 sets of users for each geographic region that include users who were associated with locations within the threshold distance of a geographic region within a specific time interval. For example, if the geographic region corresponds to a retail location, a set of users determined 320 for a particular retail location includes users who were associated with locations within the threshold distance of the retail location within one month of a current time. The user or third party system 130 associated with the geographic regions may specify the specific time interval in some embodiments. Alternatively, the online system 140 determines the specific time interval; for example, the online system 140 retrieves time intervals previously specified by the user or by the third party system 130 associated with the geographic regions or retrieves time intervals previously specified for other geographic regions having at least a threshold number of characteristics matching characteristics of the geographic region (e.g., for other retail locations selling at least a threshold number of products matching products sold by retail locations corresponding to the geographic locations).

From the information maintained 305 for various users, the online system 140 retrieves 325 characteristics of users in each set of users. The online system 140 may retrieve 325 a subset of characteristics of each user in a set in various embodiments. In various embodiments, the user or the third party system 130 associated with the geographic regions specifies the subset of characteristics of users in a set that the online system 140 retrieves 325. Example characteristics of a user in a set retrieved 325 by the online system 140 include: demographic information about the user (e.g., an age of the user, a gender of the user), interests of the user, locations associated with the user (e.g., a hometown, a residence), actions performed by the user and maintained by the online system 140, one or more objects connected to the user via the online system 140, content provided to the online system 140 by the user, or any other suitable information.

Additionally, the online system 140 may also obtain 330 characteristics of each of the geographic regions. The online system 140 may request characteristics of various geographic regions from the user or from the third party system 130 associated with the geographic regions in some embodiments. Alternatively, the online system 140 retrieves stored characteristics of different geographic regions previously received from the user or the third party system 130 associated with the geographic regions and stored by the online system 140. Example characteristics associated with a geographic region include: products associated with the geographic region (e.g., products offered for sale at a geographic region), a number of one or more products sold from a geographic region, an amount of revenue obtained by a geographic region, an amount of revenue from selling one or more products, an amount of revenue obtained by the geographic region within a specified time interval, or any other suitable information. The third party system 130 or the user associated with the geographic regions may specify the characteristics of the geographic regions obtained 330 by the online system 140.

Based on the characteristics of the sets of users and the characteristics of the geographic regions, the online system 140 generates 335 representations of each geographic region. A representation of a geographic region is generated 335 from characteristics of a set of users associated with the geographic region and obtained characteristics of the geographic region. For example, the online system 140 generates a vector for each of the geographic regions, with the vector for a geographic region based on characteristics of users of the set associated with the geographic region and characteristics of the geographic region. In one embodiment, the dimensions of the vector for a geographic region equal the number of characteristics of users of the set associated with the geographic region and characteristics of the geographic region.

In one embodiment, a value is assigned to each dimension of a vector generated 335 for a geographic region based on a value of a characteristic of a user of the set associated with the geographic region or based on the value of a characteristic of the geographic region. Various methods may be used by the online system 140 to determine the value assigned to each dimension of a vector for a geographic region. In one embodiment, a binary value is assigned to various dimensions of a vector generated for a geographic region based on whether a characteristic of a user of the set associated with the geographic region or a characteristic of the geographic region satisfies one or more criteria. For example, if a dimension corresponds to an age of a user, the value assigned to the dimension is one if the age of a user of the set associated with the geographic region is within a particular age range and is zero if the user of the set associated with the geographic region is outside of the particular age range. In the preceding example, the value of each dimension of the vector for the content item indicates whether a characteristic of a user of the set associated with the geographic region or a characteristic of the geographic region satisfies one or more criteria. As another example, the value assigned to a dimension of a vector for a content item is a value of a characteristic of a user of the set associated with the geographic region or of a characteristic of the geographic region. In this example, the value of a dimension of the vector represents an amount of revenue generated by the geographic region or an age of a user of the set associated with the geographic region. In various embodiments, the online system 140 associates weights with different characteristics of the geographic region or characteristics of users of the set of users when generating 335 a vector for the geographic region. The weights associated with different characteristics may be specified by the user or by the third party system 130 associated with the geographic regions, allowing the user or the third party system 130 to specify how representations of the geographic regions are generated 335.

Based on the representations, the online system 140 determines 340 similarities between various pairs of geographic regions based on vectors generated 335 for the geographic regions. In various embodiments, the online system 140 determines 340 similarities between vectors generated 335 for each pair of geographic region. For example, the online system 140 determines 340 distance values between each pair of vectors generated 335 for geographic regions. The distance value between a pair of vectors is a Euclidean distance in various embodiments. Alternatively, the online system 140 determines 340 cosine similarities between each pair of vectors. In other embodiments, the online system 140 determines 340 any suitable measure of similarity between various pairs of vectors generated 335 for different geographic regions.

Using the similarities between different pairs of vectors generated 335 for geographic regions, the online system 140 selects 345 a pairing of a geographic region and an additional geographic region. In various embodiments, the online system 140 selects 345 a geographic region and an additional geographic region associated with vectors having a maximum similarity. If the online system 140 determines 340 cosine similarities between pairs of vectors, the online system 140 identifies a pair of vectors having a maximum cosine similarity and selects 345 a geographic region and an additional geographic region corresponding to the identified pair of vectors. If the online system 140 determines 340 distances between pairs of vectors, the online system 140 identifies a pair of vectors having a minimum distance and selects 345 a geographic region and an additional geographic region corresponding to the identified pair of vectors. However, in various embodiments, the online system 140 selects 345 a pairing including a geographic region and an additional geographic region corresponding to vectors having a maximum similarity. The online system 140 may select 345 the pairing of the geographic region and the additional geographic region in response to receiving a request from a user or a third party system 130 associated with the geographic regions.

In some embodiments, the online system 140 applies one or more rules to the geographic regions when selecting 345 the pairing of the geographic region and the additional geographic region. For example, the online system 140 maintains a rule limiting a maximum number of pairings that may include a particular geographic region, so the online system 140 selects 345 an alternative geographic region for the pairing if a geographic region initially selected in the pairing has previously been selected 345 for inclusion in the maximum number of pairings. As another example, the online system 140 maintains a rule specifying a threshold similarity between a geographic region and an additional geographic region, so the online system 140 selects 345 a pairing of a geographic region and an additional geographic region having at least the threshold similarity to each other. In an additional example, a rule specifies a maximum number of users associated with locations within the threshold distance of both geographic regions included in a pairing. If a pairing of a geographic region and an additional geographic region includes at least the maximum number of users associated with locations within the threshold distance of both the geographic region and the additional geographic region, the online system 140 selects 345 an alternative pairing. In the preceding example, the rule allows the online system 140 to avoid selecting 345 a pairing that includes geographic regions that have been both been visited by the maximum number of common users, minimizing effects of cross traffic of users between different geographic regions affecting evaluation of differences in content presented to users visiting different geographic regions of the pairing.

The online system 140 subsequently presents certain content to users associated with locations within the threshold distance of to one of the geographic regions included in the selected pairing while withholding the certain content from users within the threshold distance of the other geographic region included in the selected pairing. For example, the online system 140 presents a content item to an additional user associated with a location within the threshold distance of the geographic region included in the selected pairing and withholds presentation of the content item to another user associated with a location within the threshold distance of the additional geographic region included in the selected pairing. A user or a third party system 130 associated with the geographic regions may identify whether a content item is presented to users associated with locations within a threshold distance of the geographic region or associated with locations within the threshold distance of the additional geographic region. Because the online system 140 selects 345 the pairing so the geographic region and the additional geographic region included in the selected pairing have a maximum similarity, presenting content to users with locations within a threshold distance of a geographic region included in the selected pairing and withholding content to users with locations within the threshold distance of the other geographic region included in the selected pairing allows the online system 140 to more accurately evaluate how presentation of the content influences user behavior.

Hence, the online system 140 may present different content items to the geographic region and the additional geographic region included in the selected pairing. As described above in conjunction with FIG. 3, the geographic region and the additional geographic region in the selected pairing have a maximum similarity to each other, so when different content is presented to users in the geographic region and users in the additional geographic region, different actions performed by users in the geographic region and users in the additional geographic region after presentation of the content can be attributed to differences between the content presented to users in the geographic region and content presented to users in the additional geographic region. For example, if a set of content items were presented to users in the geographic region of the selected pairing but were not presented to users in the additional geographic region of the selected pairing, differences in actions or characteristics of users in the geographic region of the selected pairing and users in the additional geographic region of the selected pairing may be attributed to presentation of the content items to the users in the geographic region.

Figure 4:
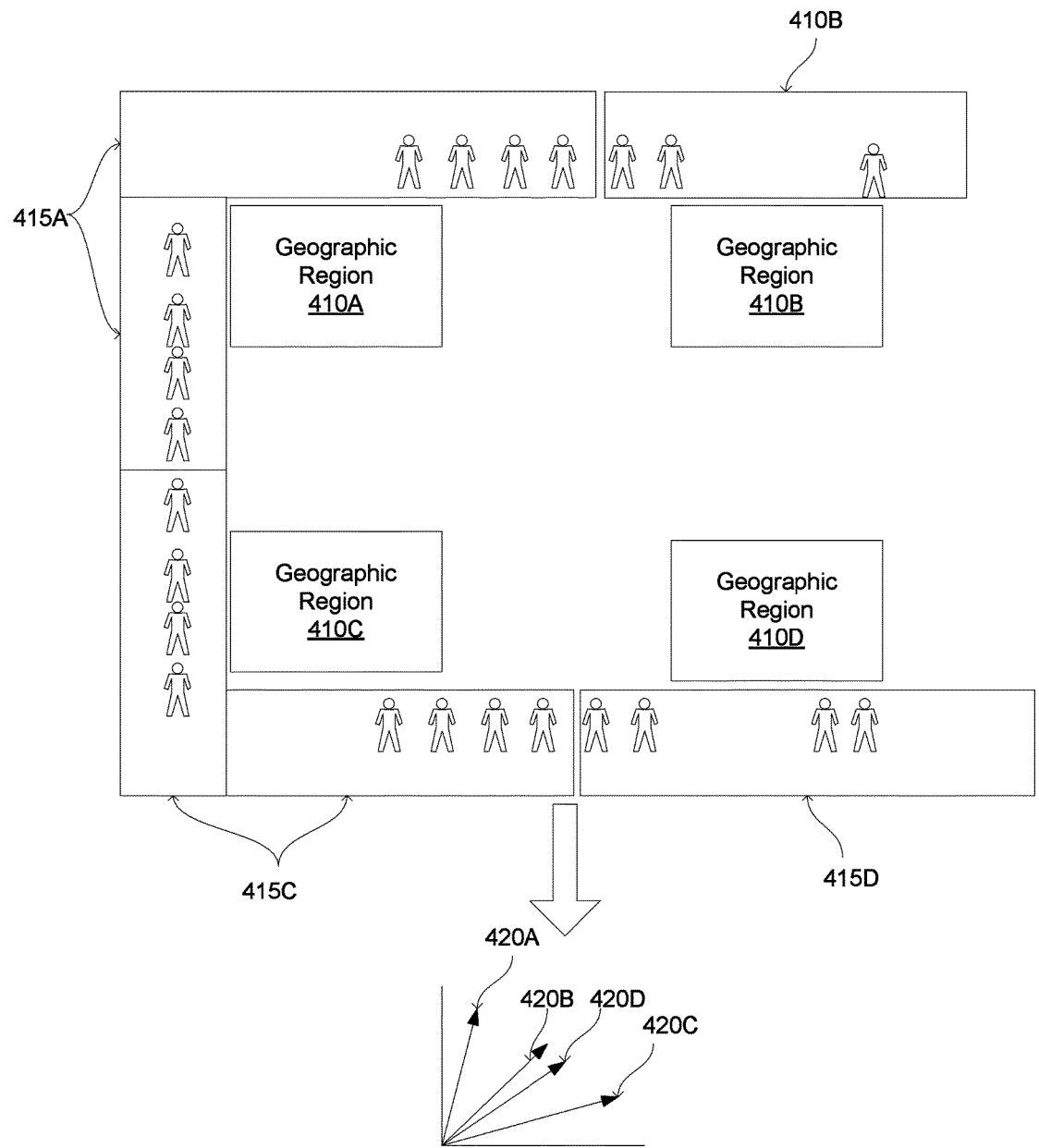
FIG. 4 is a conceptual diagram of generation of a content item generated for a user by an online system based on products accessed by the user, in accordance with an embodiment.

FIG. 4 is a conceptual diagram of an example determination of sets of users associated with locations within a threshold distance of various geographic regions. For purposes of illustration, FIG. 4 shows an example of four geographic regions 410A, 410B, 410C, 410D (also referred to individually and collectively using reference number 410) identified by the online system 140. However, any number of geographic regions 410 may be identified by the online system 140 in various embodiments.

For each of the geographic regions 410A, 410B, 410C, 410D, the online system 140 determines sets 415A, 415B, 415C, 415D of users associated with a geographic region 410. Each set 415A, 415B, 415C, 415D of users includes users associated with locations within a threshold distance of an associated geographic region 410A, 410B, 410C, 410D. In the example of FIG. 4, set 415A of users includes users associated with a location within the threshold distance of geographic region 410A, while set 415B of users includes users associated with a location within the threshold distance of geographic region 410B. Similarly, set 415C of users includes users associated with a location within the threshold distance of geographic region 410C, and set 410D of users includes users associated with a location within the threshold distance of geographic region 410D.

Based on the characteristics maintained by the online system 140 for users in each set 410A, 410B, 410C, 410D of users and characteristics of geographic regions 410A, 410B, 410C, 410D associated with each set 410A, 410B, 410C, 410D of users, the online system 140 generates representations of each geographic region 410A, 410B, 410C, 410D. In the example of FIG. 4, the online system 140 generates vectors 420A, 420B, 420C representing each of the geographic regions 410A, 410B, 410C, 410D based on characteristics of users of a set 415A, 415B, 415C, 415D of users associated with each geographic region 410A, 410B, 410C, 410D and characteristics of each geographic region 410A, 410B, 410C, 410D. Hence, in FIG. 4, vector 410A is based on characteristics of geographic region 410A and characteristics of users of the set 415A of users associated with geographic region 410A, and vector 410B is based on characteristics of geographic region 410B and characteristics of users of the set 415B of users associated with geographic region 410B. Similarly, vector 410C is based on characteristics of geographic region 410C and characteristics of users of the set 415C of users associated with geographic region 410C, while vector 410D is based on characteristics of geographic region 410D and characteristics of users of the set 415D of users associated with geographic region 410D.

As further described above in conjunction with FIG. 3, the online system 140 selects a pairing of geographic regions 410A, 410B, 410C, 410D based on the generated representations. For example, the online system 140 selects a pairing of geographic regions 410A, 410B, 410C, 410D based on distances between the vectors 420A, 420B, 420C, 420D associated with the geographic regions 410A, 410B, 410C, 410D. Hence, the online system 140 may select a pairing of geographic regions 410A, 410B, 410C, 410D associated with vectors 420A, 420B, 420C, 420D separated by a minimum distance. In the example of FIG. 4, the online system 140 selects a pairing of geographic region 410B and geographic region 410D, as the vector 420B associated with geographic region 410A and the vector 420D associated with geographic region 410D are separated by minimum distance. Such a selection of the pairing based on minimum distances between vectors 420A, 420B, 420C, 420D causes the pairing to include geographic regions 410 most likely to be similar to each other.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    maintaining, at an online system, information describing characteristics of various users of the online system;
    determining locations associated with each of at least a set of the users of the online system;
    identifying a plurality of geographic regions by the online system;
    for each of the plurality of geographic regions, determining sets of users associated with locations within a threshold distance of the geographic region of the plurality of geographic regions;
    retrieving characteristics of users in each set of users from the maintained information;
    obtaining characteristics of each of the plurality of geographic regions;
    generating vectors for each of the plurality of geographic regions, a vector for the geographic region based on characteristics of users in a set of users associated with the geographic region and obtained characteristics of the geographic region;
    determining distance values between each of the vectors;

selecting a pairing of the geographic region and an additional geographic region based on the determined distance values;

presenting a content item to users associated with locations within an additional threshold distance of the geographic region of the selected pairing; and withholding presentation of the content item to users associated with locations within the additional threshold distance of the additional geographic region of the selected pairing.

2. The method of claim 1, wherein selecting the pairing of the geographic region and the additional geographic region based on the determined distance values comprises:

identifying a specific vector and the additional vector separated by a minimum distance value; and selecting a geographic region corresponding to the specific vector and a geographic region corresponding to the additional vector as the pairing of the geographic region and the additional geographic region.

3. The method of claim 1, wherein generating vectors for each of the plurality of geographic regions comprises:

associating weights with one or more of the characteristics of users in the set of users associated with the geographic region; and generating the vector for the geographic region based on application of the weights to the associated characteristics of users in the set of users associated with the geographic region.

4. The method of claim 3, wherein generating vectors for each of the plurality of geographic regions further comprises:

associating additional weights with one or more of the characteristics of the geographic region; and generating the vector for the geographic region based on application of the additional weights to the associated characteristics the geographic region.

5. The method of claim 1, wherein each of the geographic regions corresponds to a store.

6. The method of claim 5, wherein characteristics of the geographic region are selected from a group consisting of: a number of sales of a product, an amount of revenue received within a time interval, an amount of revenue received from sales of the product, and any combination thereof.

7. The method of claim 5, wherein the threshold distance of the geographic region is specified by a user associated with the stores corresponding to the geographic regions.

8. The method of claim 5, wherein the threshold distance of the geographic region is determined by the online system.

9. A method comprising:

maintaining, at an online system, information describing characteristics of various users of the online system;

determining locations associated with each of at least a set of the users of the online system;

identifying a plurality of geographic regions by the online system;

for each of the plurality of geographic regions, determining sets of users associated with locations within a threshold distance of the geographic region of the plurality of geographic regions;

retrieving characteristics of users in each set of users from the maintained information;

obtaining characteristics of each of the plurality of geographic regions;

generating vectors for each of the plurality of geographic regions, a vector for the geographic region based on characteristics of users in a set of users associated with the geographic region and obtained characteristics of the geographic region;

determining similarities between each of the vectors; and selecting a pairing of the geographic region and an additional geographic region based on the determined similarities.

10. The method of claim 9, wherein a similarity between vectors comprises a cosine similarity between the vectors.

11. The method of claim 10, wherein selecting the pairing of the geographic region and the additional geographic region based on the determined similarities comprises:

selecting a specific vector and another vector having a maximum cosine similarity to each other; and selecting a geographic region corresponding to the specific vector and a geographic region corresponding to the other vector as the pairing.

12. The method of claim 9, wherein a similarity between vectors comprises a distance value between the vectors.

13. The method of claim 12, wherein selecting the pairing of the geographic region and the additional geographic region based on the determined distance values comprises:

identifying a specific vector and the additional vector separated by a minimum distance value; and selecting a geographic region corresponding to the specific vector and a geographic region corresponding to the additional vector as the pairing of the geographic region and the additional geographic region.

14. The method of claim 9, wherein generating vectors for each of the plurality of geographic regions comprises:

associating weights with one or more of the characteristics of users in the set of users associated with the geographic region; and generating the vector for the geographic region based on application of the weights to the associated characteristics of users in the set of users associated with the geographic region.

15. The method of claim 14, wherein generating vectors for each of the plurality of geographic regions further comprises:

associating additional weights with one or more of the characteristics of the geographic region; and generating the vector for the geographic region based on application of the additional weights to the associated characteristics the geographic region.

16. The method of claim 9, wherein each of the geographic regions corresponds to a retail location.

17. The method of claim 16, wherein characteristics of the geographic region are selected from a group consisting of: a number of sales of a product, an amount of revenue received within a time interval, an amount of revenue received from sales of the product, and any combination thereof.

18. The method of claim 9, further comprising:

presenting a content item to users associated with locations within an additional threshold distance of the geographic region of the selected pairing; and withholding presentation of the content item to users associated with locations within the additional threshold distance of the additional geographic region of the selected pairing.

19. A computer program product comprising a computer readable storage medium having instructions encoded thereon that, when executed by a processor, cause the processor to:

maintain, at an online system, information describing characteristics of various users of the online system;

determine locations associated with each of at least a set of the users of the online system;

identify a plurality of geographic regions by the online system;

for each of the plurality of geographic regions, determine sets of users associated with locations within a threshold distance of the geographic region of the plurality of geographic regions;

retrieve characteristics of users in each set of users from the maintained information;

obtain characteristics of each of the plurality of geographic regions;

generate vectors for each of the plurality of geographic regions, a vector for the geographic region based on characteristics of users in a set of users associated with the geographic region and obtained characteristics of the geographic region;

determine similarities between each of the vectors; and select a pairing of the geographic region and an additional geographic region based on the determined similarities.

20. The computer program product of claim 19, wherein the computer readable storage medium further has instructions encoded thereon that, when executed by the processor, cause the processor to:

present a content item to users associated with locations within an additional threshold distance of the geographic region of the selected pairing; and withhold presentation of the content item to users associated with locations within the additional threshold distance of the additional geographic region of the selected pairing.

* * * * *